United States Patent [19]
Barnes et al.

[11] Patent Number: 5,313,769
[45] Date of Patent: May 24, 1994

[54] ROW FOLLOWER ENCODER SUPPORT AND METHOD OF MOUNTING SAME ONTO AN AGRICULTURAL VEHICLE

[75] Inventors: Ronny L. Barnes, O'Donnell; H. Wayne Mathews, Denison, both of Tex.

[73] Assignee: Gar-Bar Corporation, O'Donnell, Tex.

[21] Appl. No.: 14,806

[22] Filed: Feb. 8, 1993

[51] Int. Cl.⁵ .................................. A01D 69/04
[52] U.S. Cl. ................... 56/10.2; 180/131; 172/6
[58] Field of Search ........... 56/10.2, DIG. 15; 180/131; 172/5,6

[56] References Cited

U.S. PATENT DOCUMENTS

| | | | |
|---|---|---|---|
| 2,981,355 | 4/1961 | Robuse | 172/5 X |
| 5,040,613 | 8/1991 | Dodd et al. | 180/131 X |
| 5,121,799 | 6/1992 | Barnes et al. | 172/6 |
| 5,148,873 | 9/1992 | Barnes et al. | 172/5 |
| 5,185,990 | 2/1993 | Barnes et al. | 56/51 |

FOREIGN PATENT DOCUMENTS 264277 11/1970 U.S.S.R. .................................. 172/6

*Primary Examiner*—David J. Bagnell
*Attorney, Agent, or Firm*—Wendell Coffee

[57] ABSTRACT

An encoder is mounted upon a vehicle within a sealed, tubular housing. The encoder is mounted within the housing by a shock absorbing mount. Stub shafts extend from each end of the tubular housing which are co-axial and which are aligned with a direction of movement of the vehicle. The stub shafts are sturdy and carry a row follower upon them. The row follower contacts a path to be followed along the ground. At least one of the sturdy stub shafts are connected to the encoder by a shock absorbing, flexible coupling. The encoder translates signals by which the vehicle is guided along the path contacted by the row follower.

9 Claims, 4 Drawing Sheets

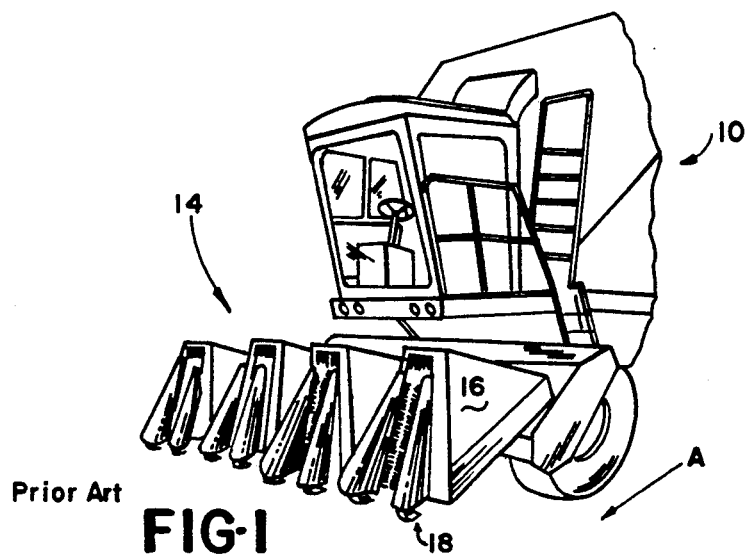
Prior Art
FIG·1
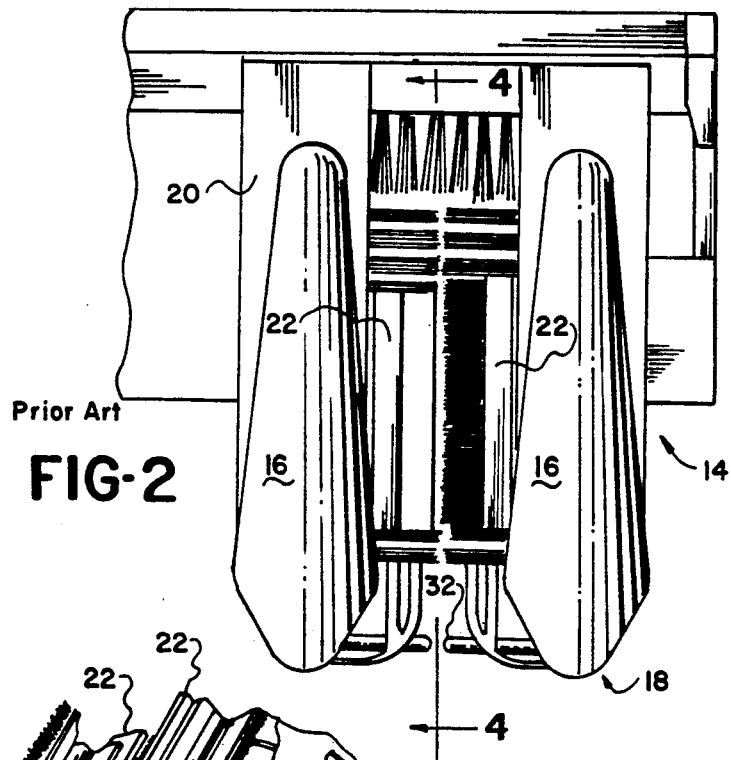
Prior Art
FIG-2
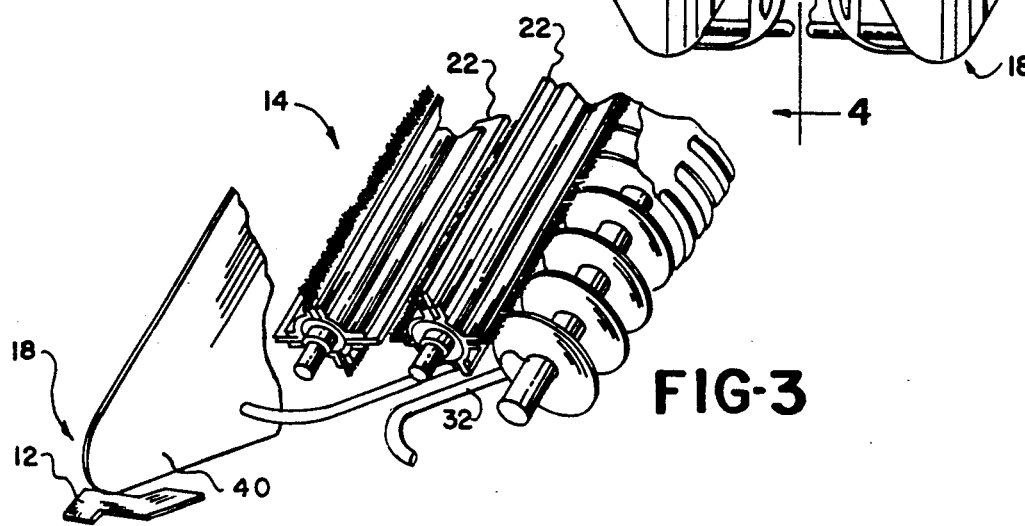
FIG-3

ND OF MOUNTING SAME ONTO AN
ROW FOLLOWER ENCODER SUPPORT AND METHOD OF MOUNTING SAME ONTO AN AGRICULTURAL VEHICLE

CROSS REFERENCE TO RELATED APPLICATION

This application was co-pending with U.S. patent application Ser. No. 07/814,767, filed Dec. 30, 1991, which was issued as U.S. Pat. No. 5,185,990, on Feb. 16, 1993 after the filing of this application and which has common ownership with this application.

BACKGROUND OF THE INVENTION (1) Field of the Invention

This invention relates to agriculture and more particularly to row followers forming a portion of an agricultural vehicle guidance system. As used herein, "agricultural vehicle" or "vehicle" means a wheeled vehicle normally used on a farm such as used for harvesting, planting, or tilling. These vehicles are sometimes called strippers, pickers, combines, or tractors.

Farmers are the ones having ordinary skill in this art.

(2) Description of the Related Art

As set out in the BARNES et al U.S. Pat. No. 5,121,799, it is desirable to have a vehicle which can be guided along a designated path. Normally the designated path by which the vehicle will be guided will be a row which might be either a series of stalks, as described in the BARNES et al U.S. Pat. No. 5,148,873, or it might be a furrow as shown in U.S. Pat. No. 5,121,799, as well as U.S. Pat. No. 5,148,873. Also, U.S. Pat. No. 5,185,990 identified above illustrates a row follower to follow the stalks.

An encoder as shown in U.S. Pat. No. 5,148,873 is used to measure the deviation of the row follower from the vehicle to indicate corrections to be applied to the steering mechanisms of the vehicle as more fully set out in U.S. Pat. No. 5,121,799.

Problems have been encountered with the encoders which are believed to include rough handling, or shock to the encoders, particularly to the rotating shaft of the encoder within the body of the encoder.

Another source of problem with the encoders is believed to be environmental inasmuch as in the agriculture processes there is usually dust and sand which are stirred up and which tend to infiltrate the housing of the encoder. Also normally, agricultural vehicles are not housed within a closed building and are often left exposed to rain, snow, and dew, as well as the dust and sand.

SUMMARY OF THE INVENTION

Progressive Contribution to the Art

This application discloses a carrier to mount the encoder to the vehicle and to mount the row follower to the encoder.

It has been found that if the encoder is mounted within a tubular housing, such as a rectangular, structural member having a square cross section, that the housing can be sealed to prevent excessive dust and moisture from entering the housing. Also, the housing is a sturdy support for bearings by which stub shafts may be mounted to the tubular structural member. The encoder is mounted upon a rubber shock absorber and connected to one of the stub shafts with a flexible shock absorbing coupler to shield the encoder from rough handling and violent encounters which the shafts extending from the housing might encounter. The housing has a lid or cover with gaskets over an access opening to prevent moisture and sand from entering. Dust proof bearing guards are well known. By providing these on the bearings, dust is excluded from the bearings and also from the interior of the tubular housing.

Objects of this Invention

An object of this invention is to reliably guide a vehicle along a path.

Other objects are to provide a protective support and housing for the encoder which connects the row follower to the vehicle.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawings, the different views of which are not necessarily scale drawings.

DESCRIPTION OF THE DRAWINGS

FIG. 1 is a perspective view of the prior art showing a vehicle with cotton harvesting equipment mounted thereon as would be a typical usage for this invention.

FIG. 2 is a front elevational view of a portion of the prior art showing the cotton harvesting equipment for a single row and also showing stalk engaging row followers.

FIG. 3 is a perspective view of the equipment shown in FIG. 2 with housings and covers removed showing more particularly the positioning of the row follower.

Figure 4:
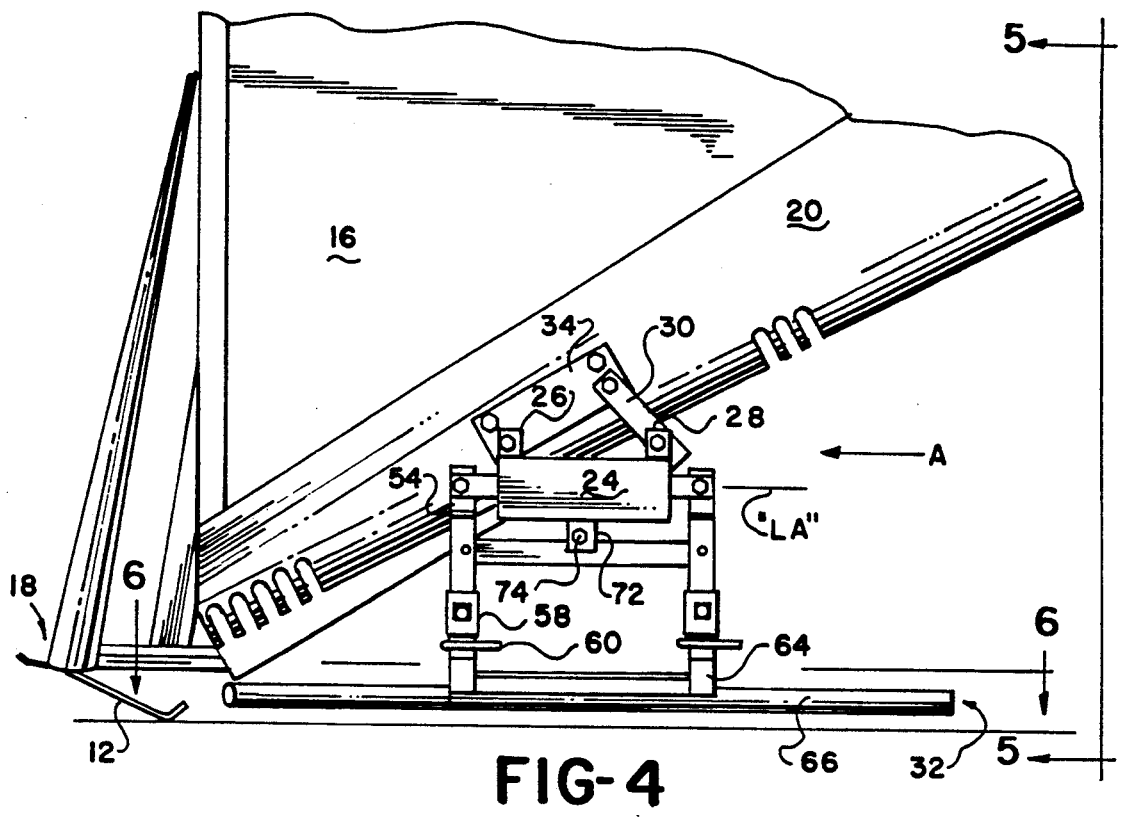
FIG. 4 is a side elevational view of an embodiment of this invention taken substantially on line 4—4 of FIG. 2.

As an aid to correlating the terms of the claims to the exemplary drawings, the following catalog of elements and steps is provided:

"LA" longitudinal axis
"S" stalks
"A" arrow showing direction of travel
10 tractor or vehicle
12 skid
14 harvester
16 header unit 18 front of header unit
20 conveyor box
22 stripper rolls
24 housing
26 front bracket
28 rear bracket
30 straps
32 row follower
34 pads
36 encoder
38 wires
40 shields
42 disk
44 steering wheel
46 front bearing
48 stub encoder shaft
50 dust shield
52 encoder arm
54 angle structure
56 tubular cup
58 follower tube
60 pin
62 set screw
64 angle supports
66 encoder rail
68 back up rail
70 spring bracket
72 helical spring
74 adjustment nut
76 backup housing
75 stops
78 rear stub shaft
80 reducing coupler
82 jack shaft
84 absorption coupler
86 encoder shaft
88 encoder bracket
90 shock mounting
92 bolt head
94 inspection opening
96 cover plate
98 gasket
100 grommet

DESCRIPTION OF THE PREFERRED EMBODIMENTS

Referring to the drawings and particularly FIGS. 1, 2, and 3, there may be seen tractor or vehicle 10 with cotton harvester 14 attached thereto. The cotton harvester, as illustrated, has four header units 16 thereon, there being one header unit for each row of cotton to be harvested.

Figure 5:
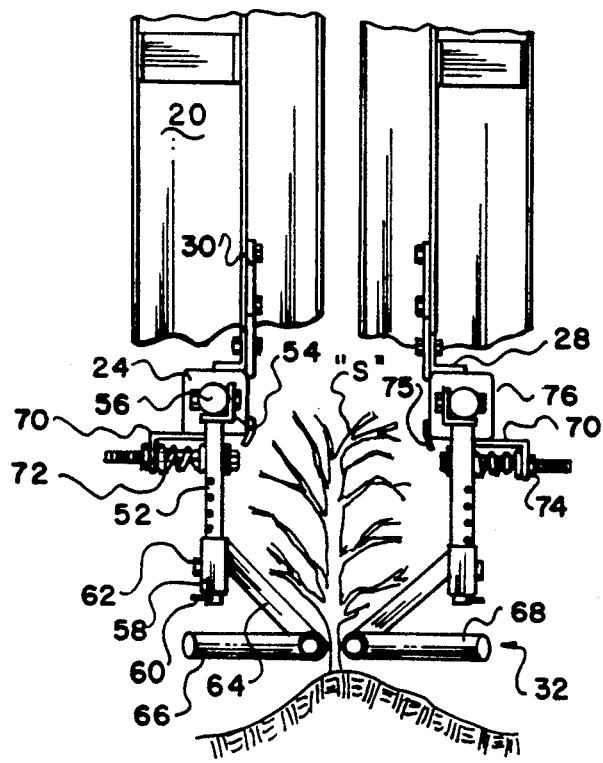
FIG. 5 is a rear elevational view of the invention with parts broken away for clarity taken substantially on line 5—5 of FIG. 4.
Figure 6:
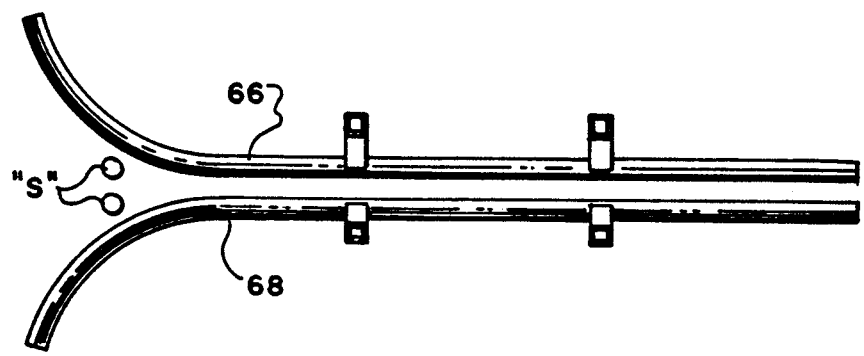
FIG. 6 is a top plan sectional view taken substantially on line 6—6 of FIG. 4 showing the row followers.
Figure 7:
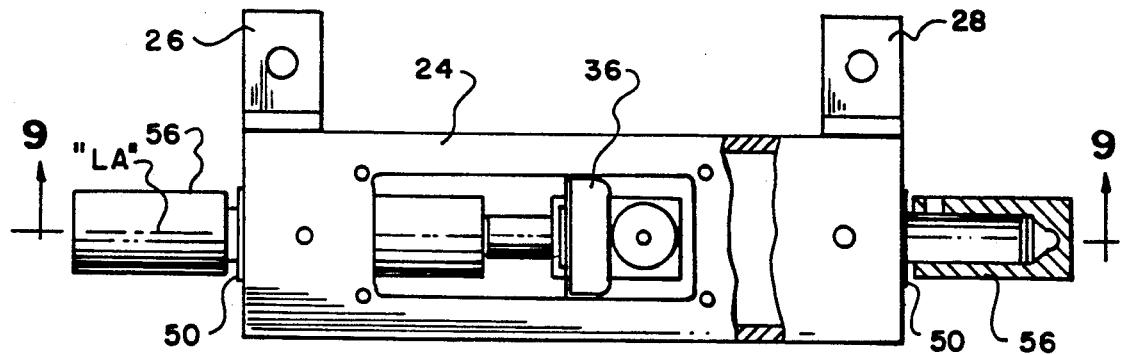
FIG. 7 is a top plan view of the encoder housing taken substantially on line 7—7 of FIG. 4 with the cover removed and parts broken away and sectioned to show details of construction.

The header units 14 will include stripper rolls 22 which operate most efficiently if the stalk "S" of the cotton is centered, as near as possible, between the stripper rolls. (FIG. 5) A variation of a fraction of an inch of the gap between the center of the stripper rolls 22 to the stalks "S" of cotton will cause a loss of the crop to be harvested. Front 18 on shield 40 of the harvesting unit 16 has skids 12 thereon to prevent the front 18 of the unit from digging into the ground as the unit is moved along in the direction of travel "A".(FIG. 4)

The elements described to this point are old and well known to the art and they are illustrated to show the environment within which the guidance system with the row followers 32 operate. The row followers 32 are substantially similar as to those shown in U.S. Pat. No. 5,185,990.

The support for encoder 36 is elongated tubular housing, or body 24.(FIGS. 4, 5, 7, and 9) Front bracket 26 is welded to the front thereof and rear bracket 28 is welded to the rear of the body 24. With the addition of suitable straps 30 and pad 34, which is, as shown, attached to the lower side of conveyor box 20, the housing or body 24 is rigidly and securely attached to the vehicle 10. The brackets 26 and 28 form a means for connecting the body 24 to the vehicle so that a longitudinal axis "LA" of the body is aligned with the direction of travel shown by arrow "A". It will be understood that the longitudinal axis is not necessarily in the center of the housing 24. As stated previously, the housing 24 is square in cross section and tubular.

Figure 8:
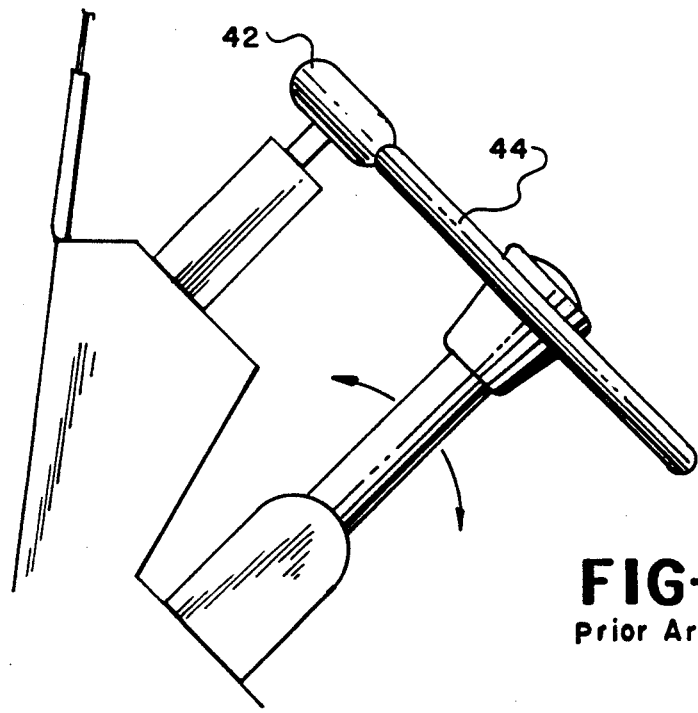
FIG. 8 shows the steering mechanism and the means for turning the steering wheel.
Figure 9:
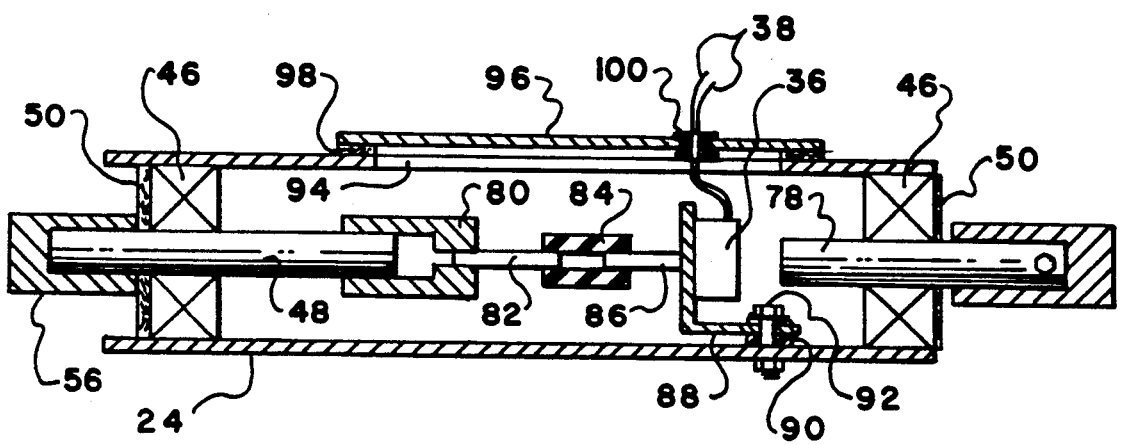
FIG. 9 is a sectional view of the encoder housing taken substantially on line 9—9 of FIG. 7.

The encoder 36 is housed within the body 24. The encoder 36 is a detecting means for detecting relative movement between the row follower 32 and the vehicle 10, and also it is a translating means for translating the relative movements into transmittable signals. The transmittable signals are carried by electrical impulses and wires 38 to other electrical devices which control the rotation of compressible, flexible disk 42 which is adapted to ride against steering wheel 44 whereby the direction of travel "A" of the vehicle can be varied.- (FIG. 8)

Front bearing 46 is mounted inside of the housing 24 at the front thereof.(FIG. 9) Stub encoder shaft 48 is journalled by the bearing 46 to the housing 24. As previously stated, the front bearing has dust shield 50 to prevent dust from entering the housing 24.

Encoder arm 52 has angle structure 54 at the top thereof.(FIG. 5) The angle structure 54 is bolted to tubular cup 56 which is telescoped over the stub encoder shaft 48. The encoder arm 52 depends about vertically downward and telescopes within row follower tube 58. Pin 60 extends through one of a series of holes in the encoder arm 52 to limit the downward movement of the tube 58. Otherwise the tube is secured to the encoder arm by set screw 62. Angle supports 64 connect the tube 58 to the row followers 32. The row followers are basically as those described in U.S. Pat. No. 5,185,990, however, the row followers of this embodiment are supported by a front arm and a back arm and have no linkage connection at the front nose thereof. They likewise have outwardly extending front elements to form a throat at the front so that stalks of the cotton "S" are guided within the row followers between encoder rail 66 and back up rail 68.

Spring bracket 70 is secured as by welding to the bottom of the housing 24. Helical compression spring 72 extends between the bracket 70 and the upper portion of encoder arm 52. The movement of the encoder arms and therefore the encoder rail 66 is limited by adjustment nut 74 and stops 75. The preferred point for the limit would be so that the springs push the encoder arm 66 for an inch or more past the center of the space. The center, in this case, is defined as the center position between the two stripper rolls 22. As will be discussed later, there will be a backup housing 76 mounted opposite the housing 24. It also will carry a bracket 70, spring 72, adjustment nut 74 and stop 75.

In normal operations as explained in U.S. Pat. No. 5,185,990, the encoder rail 66 and backup rail 68 will press against the row of stalks "S". The movement of the rail 66 from the center position will be displacement of the vehicle 10 from the row of stalks "S". As explained above, it is desired that this deviation not be greater than a fraction of an inch to maintain proper harvesting. The movement of the rail 66 will be transmitted through the arm 52 to the encoder shaft 48 and thus the encoder 36.

The backup housing 76 is connected to the conveyor box 20 by front and rear brackets 26 and 28 to a pad 34. Inasmuch as these elements as well as a backup arm, are all mirror images of the encoder arm and tubular cups, follower tubes, angle supports, and the like, they will not be again described in detail.

Figure 10:
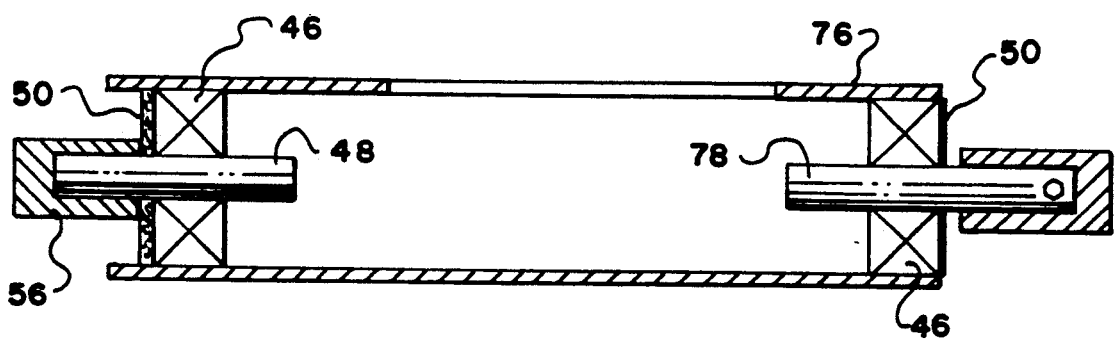
FIG. 10 is a similar to view to FIG. 9 showing a backup housing.

As seen in FIG. 10 the housing 76, front bearings 46, dust shields 50 and stub shafts 48 are all identical to those in the encoder housing 24. However, the stub shaft 48 in the housing 76 has no connection thereto. This is also true of the rear stub shafts 78. On the distal or exterior end of the stub shaft 78, a tubular cup is used which is identical to the tubular cup 56. Although a cover plate is preferred for housing 76, none is shown in FIG. 10.

Inside the encoder housing 24, reducing coupling 80 connects the stub encoder shaft 48 to jack or extension shaft 82. The jack shaft is connected by vibration absorption flexible coupler 84 to the encoder shaft 86. The encoder shaft 86 is an integral part of the encoder 36. In effect, the flexible connector 84 connects the encoder shaft to the stub axle 48 through coupler 80 and shaft 82. The absorption coupler is made of a resilient substance which is basically tubular in nature and has a series of slots therein so that any shock-like movement that might be present in the stub shaft 48 is not transmitted to the encoder 36. As explained before, it is an object of this invention to protect the encoder 36 from shock.

Also to this end, the encoder is mounted upon encoder bracket 88. Encoder bracket 88 is not connected directly to the encoder housing 24 but is isolated from the housing by resilient washers or shock mounting 90. As those skilled in art will understand, shock mountings have a resilient member both between the bracket 88 and the housing 24 and also between the bracket 88 and bolt head 92 which secures the shock mounting 90 and the encoder bracket 88 with the encoder 36 within the housing. It will be understood that the openings into the encoder housing 24 are well sealed. Specifically, inspection opening 94 is sealed by cover plate 96 which is sealed by gasket 98 to the housing 24 around the opening 94. Where the wires 38 extend outside of the housing, grommet 100 prevents moisture or dust from entering the housing.

It will be understood that the housing protects the encoder and prevents the encoder from being damaged by shock, or by dust, or by moisture that it might otherwise be exposed to. In addition, it may be seen that the sturdy housing 24 along with the housing 76 provide an ideal hinge device or pivot device by which the encoder rail 66 and backup rail 68 are attached. This invention provides for a compact attachment which is more readily adapted to existing equipment and which is more compact in design and structure. The stub shafts are sturdy. Protected bearings and sturdily designed, the encoder rails 66 and backup rails 68 more readily follow the row of cotton and provide a more accurate translation of any deviation to the encoder for better operation of the steering mechanism 44 whereby the vehicle follows precisely the row of stalks "S".

The embodiment shown and described above is only exemplary. We do not claim to have invented all the parts, elements or steps described. Various modifications can be made in the construction, material, arrangement, and operation, and still be within the scope of our invention.

The restrictive description and drawings of the specific examples above do not point out what an infringement of this patent would be, but are to enable one skilled in the art to make and use the invention. The limits of the invention and the bounds of the patent protection are measured by and defined in the following claims.

We claim as our invention:

1. An encoder support to be mounted upon
   a) an agricultural vehicle having a direction of travel, the support carrying
   b) an encoder, and
   c) a row follower,
   d) the encoder being
      i) detecting means for detecting relative movement between a row follower and vehicle, and
      ii) translating means for translating the relative movement into transmittable signals,
   wherein the improved support comprises:
   e) an elongated tubular encoder body having a longitudinal axis,
   f) a mounting bracket on the body forming a portion of means for mounting the body on a vehicle with the longitudinal axis aligned with the direction of travel,
   g) a stub encoder shaft aligned with the longitudinal axis extending from within the tubular body to outside the body,
   h) a bearing connecting the stub shaft to the body,
   j) an encoder arm connected to the shaft outside the body adapted to be connected to a row follower, and
   k) said encoder connected to the stub encoder shaft inside the body.

2. The invention as defined in claim 1 further comprising:
   l) a stub stabilizer shaft co-axial with the stub encoder shaft extending from within the tubular body to outside the tubular body,
   m) a stabilizer bearing connecting the stub stabilizer shaft to the body, and
   n) a stabilizer arm connected to the stabilizer shaft outside the body adapted to be connected to a row follower.

3. The invention as defined in claim 1 further comprising:
   l) said encoder having a rotatable shaft co-axial with the stub encoder shaft,
   m) a flexible coupler having two ends, one end of said flexible coupler connected to the stub encoder shaft and the other end of the coupler connected to the shaft of the encoder.

4. The invention as defined in claim 1 further comprising:
   l) said mounting bracket attached to a portion of an agricultural vehicle,
   m) said arm attached to a row follower, and
   n) said longituding axis of said encoder body aligned with the direction of travel of the vehicle.

5. The invention as defined in claim 4 further comprising:
   o) a tubular back up body having an elongated axis attached to said vehicle,
   p) said back up body having a back up longitudinal axis aligned with the direction of travel, q) said back up tubular body having two ends with a back up stub shaft extending from each end aligned with the back up longitudinal axis,
r) a bearing on each end of the back up tubular body connecting each shaft to the back up tubular body,
s) a back up arm on each of the back up shafts,
t) said back up arms connected to a back up row follower,
u) an encoder spring extending from the encoder longitudinal body to the encoder arms for biasing the encoder arms toward the back up arms, and
v) a back up spring extending from the back up body to the back up arms for biasing the back up arms toward the encoder arms, whereby
w) said row followers are adapted to ride on either side of a row of stalks.

6. The method of mounting an encoder onto an agricultural vehicle which has a direction of travel, comprising:
a) sealing and encapsulating an encoder inside of a tubular body,
b) connecting said encoder to a stub shaft which extends from one end of an enclosed body,
c) rigidly attaching the enclosed body onto the vehicle,
d) aligning the stub shaft with the direction of travel,
e) extending row follower arms from the stub shaft.

7. The invention as defined in claim 6 wherein said encoder has a shaft, and further comprising the following steps:

f) aligning the encoder shaft with the stub shaft,
g) connecting the encoder shaft to the stub shaft with a flexible coupler.

8. The invention as defined in claim 6 further comprising:
f) journalling a second stub shaft onto said sealed tubular body coaxial with the aforementioned stub shaft, and
g) attaching a row follower arm to said second stub shaft,
h) attaching a row follower to said row follower arms.

9. The invention as defined in claim 8 further comprising:
j) providing a back up tubular body,
k) journalling two co-axial stub shafts to the back up body,
l) attaching arms to the stub shafts,
m) rigidly connecting the back up body to the vehicle with the stub shafts aligned with the direction of draft,
n) placing a row follower arm on each of the stub shafts,
o) attaching a row follower to the row follower arms,
p) biasing the arms of the encoder toward the back up arms, and
q) biasing the back up arms toward the encoder arms, thereby
r) pressing the row followers against a row of stalks there between.

* * * * *